(12) United States Patent
Gruel

(10) Patent No.: US 7,419,134 B2
(45) Date of Patent: Sep. 2, 2008

(54) VALVE ACTUATION ASSEMBLY

(75) Inventor: Christopher Michael Gruel, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 66 days.

(21) Appl. No.: 11/191,025

(22) Filed: Jul. 28, 2005

(65) Prior Publication Data
US 2007/0023717 A1    Feb. 1, 2007

(51) Int. Cl.
*F16K 31/12* (2006.01)

(52) U.S. Cl. .................. 251/59; 251/30.01; 92/124; 91/339

(58) Field of Classification Search ............ 251/30.01, 251/59; 92/120, 121, 124; 91/266, 339, 91/392, 410, 420, 469
See application file for complete search history.

(56) References Cited

U.S. PATENT DOCUMENTS

| | | | |
|---|---|---|---|
| 265,950 A * | 10/1882 | Fitts ............................ 173/100 |
| 3,051,143 A * | 8/1962 | Nee ............................... 92/92 |
| 3,752,041 A * | 8/1973 | Smith ........................... 91/416 |
| 3,948,231 A | 4/1976 | Smith | |
| 3,971,296 A * | 7/1976 | Tugwell ....................... 91/392 |
| 4,099,659 A * | 7/1978 | Grimaldi, Jr. ................ 227/130 |
| 4,196,708 A | 4/1980 | May et al. | |
| 4,379,543 A * | 4/1983 | Reaves ......................... 251/59 |
| 5,007,330 A * | 4/1991 | Scobie et al. ................. 92/120 |
| 5,271,313 A * | 12/1993 | Lindegren, III .......... 91/358 R |
| 5,809,955 A * | 9/1998 | Murata et al. ............ 123/90.17 |
| 6,318,701 B1 * | 11/2001 | Gardner ....................... 251/59 |
| 6,328,701 B1 * | 12/2001 | Terwilliger ................. 600/567 |
| 6,422,216 B1 | 7/2002 | Lyko et al. | |
| 6,574,956 B1 | 6/2003 | Moraal et al. | |
| 6,843,239 B2 | 1/2005 | Fensom et al. | |
| 2002/0185116 A1 | 12/2002 | Veinotte | |
| 2003/0084887 A1 | 5/2003 | Veinotte | |
| 2003/0111066 A1 | 6/2003 | Veinotte | |
| 2004/0177838 A1 | 9/2004 | Veinotte | |
| 2004/0177839 A1 | 9/2004 | Veinotte | |

* cited by examiner

*Primary Examiner*—John K Fristoe, Jr.
(74) *Attorney, Agent, or Firm*—Finnegan, Henderson, Farabow, Garrett & Dunner

(57) ABSTRACT

A valve actuation assembly includes a housing and a vane connected to a shaft. The vane is at least partially disposed within the housing. The valve actuation assembly further includes a valve assembly connected to the housing and a feedback device connected to at least one of the vane and the shaft. The feedback device is configured to apply a feedback force to the valve assembly.

22 Claims, 4 Drawing Sheets

VALVE ACTUATION ASSEMBLY

TECHNICAL FIELD

The present disclosure is directed to a valve actuation assembly and, more particularly, to a valve actuation assembly configured to control an exhaust gas recirculation ("EGR") valve.

BACKGROUND

To minimize pollutants produced by internal combustion engines, a portion of the engine exhaust may be recirculated to an intake of the engine. An EGR valve, such as a mixing valve, may be used to assist in directing the portion of the exhaust to the intake. Such valves typically require a great deal of torque for actuation during engine operation. In addition, such valves are often disposed within the engine compartment and, thus, require compact actuation assemblies due to space constraints.

U.S. Pat. No. 3,948,231 issued to Smith ("the '231 patent") discloses a power and deceleration governor for automotive engines including a butterfly-type mixture control valve. In a first embodiment, the valve is actuated using a rack and pinion assembly driven by a diaphragm motor. In a second embodiment, the valve is actuated using a hydraulic cylinder, and in a third embodiment, the valve is actuated using a clutch drive motor.

While the governors of the '231 patent may be configured to actuate the mixture control valve, each of the disclosed governors are relatively large and cumbersome, and may be difficult to package in a conventional engine compartment. In addition, each of the governors relies on a vacuum system for actuation. Such a system may not supply the requisite torque to open, close, and/or otherwise actuate the mixture control valve in certain engine operating conditions. Moreover, the governors of the '231 patent may not control the mixing valve using an internal feedback mechanism.

The disclosed valve actuation assembly is directed toward overcoming one or more of the problems set forth above.

SUMMARY OF THE INVENTION

In one exemplary embodiment of the present disclosure, a valve actuation assembly includes a housing and a vane connected to a shaft. The vane is at least partially disposed within the housing. The valve actuation assembly further includes a valve assembly connected to the housing and a feedback device connected to at least one of the vane and the shaft. The feedback device is configured to apply a feedback force to the valve assembly.

In another exemplary embodiment of the present disclosure, a valve actuation assembly includes a housing defining a chamber, and a vane disposed within the chamber and connected to a shaft of the valve actuation assembly. The valve actuation assembly also includes a valve assembly connected to the housing, and a feedback device in communication with the valve assembly and connected to at least one of the vane and the shaft. The feedback device is configured to assist in controlling the position of the vane within the chamber.

In still another exemplary embodiment of the present disclosure, a method of controlling a mixing valve with a valve actuation assembly having a valve assembly connected thereto includes sensing at least one of an operating characteristic of a power source and a flow characteristic of an exhaust flow of the power source. The method also includes determining a desired mixing valve position based on the sensing and changing the position of a spool of the valve assembly to a biased position. The method further includes changing the position of a vane of the valve actuation assembly to an equilibrium position using a pressurized working fluid. The equilibrium position corresponds to the desired mixing valve position. The method still further includes providing internal position feedback to the valve assembly representative of an actual vane position.

DETAILED DESCRIPTION

Figure 1:
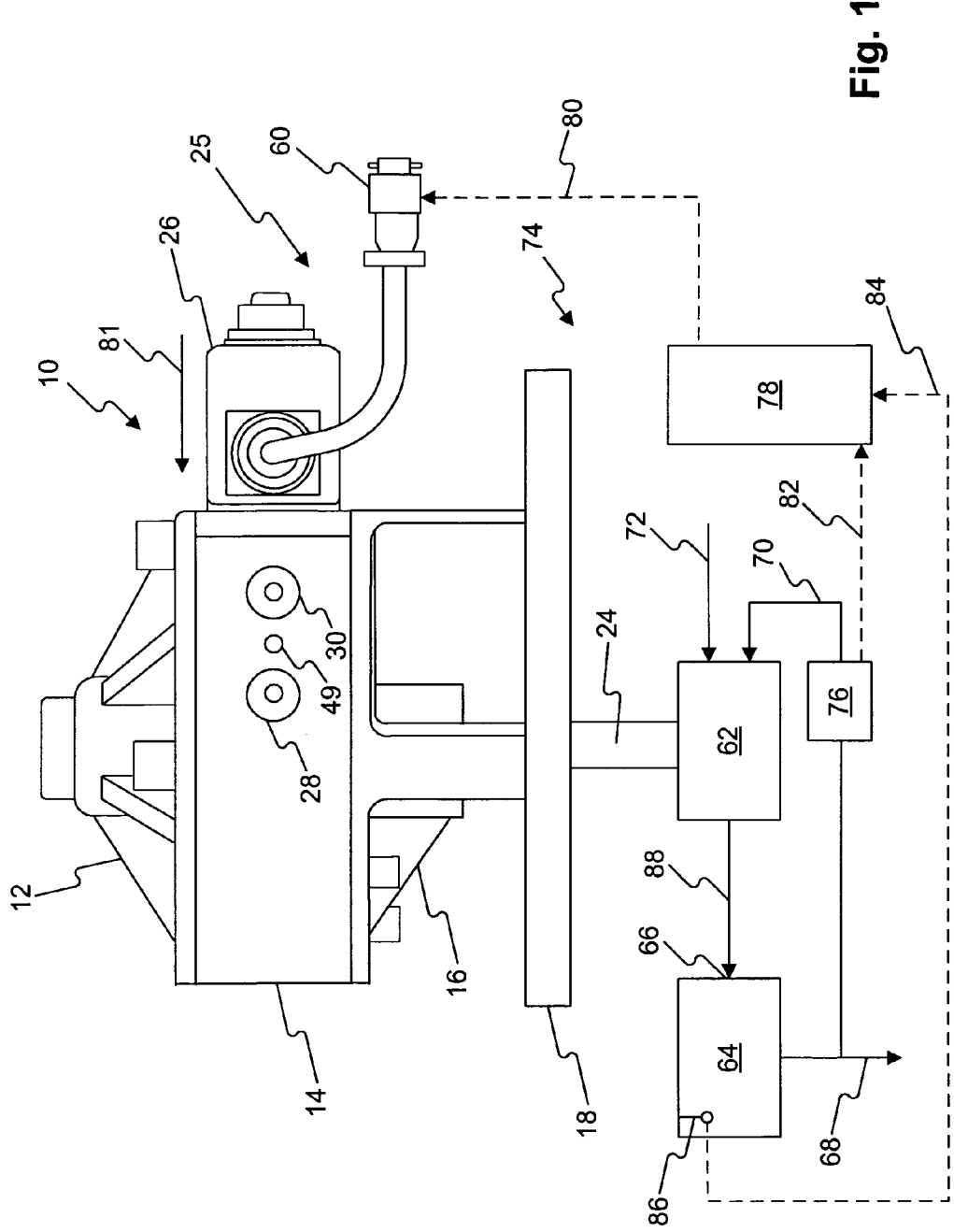
FIG. 1 is a partial diagrammatic illustration of a valve actuation assembly connected to a mixing valve according to an exemplary embodiment of the present disclosure.

As shown in FIG. 1, an actuation assembly 10, according to an exemplary embodiment of the present disclosure, may include a valve assembly 25 connected to a housing 14. The actuation assembly 10 may also include a top cover 12 and a bottom cover 16 connected to the housing 14, and an adapter plate 18 connected to the bottom cover 16. The actuation assembly 10 may further include a shaft 24 at least partially disposed within the housing 14. At least a portion of the shaft 24 may extend outside of the housing 14. As shown in FIG. 1, the shaft 24 may extend beyond the adapter plate 18. In an exemplary embodiment, the adapter plate 18 may be configured to connect to a mixing valve 62, and the shaft 24 may be configured to controllably actuate components of the mixing valve 62 when the actuation assembly 10 is connected thereto.

The housing 14 may define a supply port 28 and a drain port 30. The supply port 28 and the drain port 30 may be configured to accept a working fluid, such as, for example, pressurized oil from an oil sump (not shown). The ports 28, 30 may also be configured to direct oil from the housing 14 to the oil sump. As will be described in greater detail below, the housing 14 may also define a plurality of additional passages and/or channels configured to direct a flow of fluid through the housing 14 and/or between the supply port, 28, the drain port 30, and a vane channel 50 (FIG. 3) of the housing 14. The housing 14 may also include one or more plugs 49 configured to substantially fluidly seal such passages and/or channels.

The housing 14 may be made of any material known in the art, such as, for example, steel, aluminum, and/or alloys thereof. Such materials may be capable of withstanding operating temperatures in excess of 150 degrees Celsius without experiencing a substantial degradation in structural integrity. In an exemplary embodiment, the top cover 12, bottom cover 16, and housing 14 may be made of the same material, and each of these components may have substantially the same thermal expansion rate. It is understood that the actuation assembly 10 may have any shape, size, and or other configuration so as to maximize the torque supplied by the shaft 24. It is also understood that the overall size of the actuation assembly 10 may be desirably minimized so as to reduce the amount of space required to package the actuation assembly 10 within, for example, an engine compartment of a work machine.

With continued reference to FIG. 1, the valve assembly 25 may include a control valve 26 and a connector 60. Although shown in FIG. 1 as connecting to a side portion of the housing 14, it is understood that the control valve 26 may be mounted anywhere along the housing 14 to controllably regulate the passage of one or more flows of working fluid through housing 14. The connector 60 may be any electrical connector known in the art. In an exemplary embodiment, the connector 60 may be configured to transmit and/or receive electronic signals containing, for example, control valve actuation and/or position information. The control valve 26 may include any controllable actuation device known in the art. In an exemplary embodiment, the controllable actuation device may include a solenoid (not shown) having a cylinder configured to move along a solenoid axis when the solenoid is energized. In such an embodiment, the connector 60 may be configured to transmit an electric current to the solenoid to energize the solenoid and facilitate the controlled movement of the cylinder. It is understood that, although described herein as an electric control valve including a solenoid, the control valve 26 may be any other type of control valve known in the art. The control valve 26 may be a two-way, three-way, or four-way valve.

Figure 2:
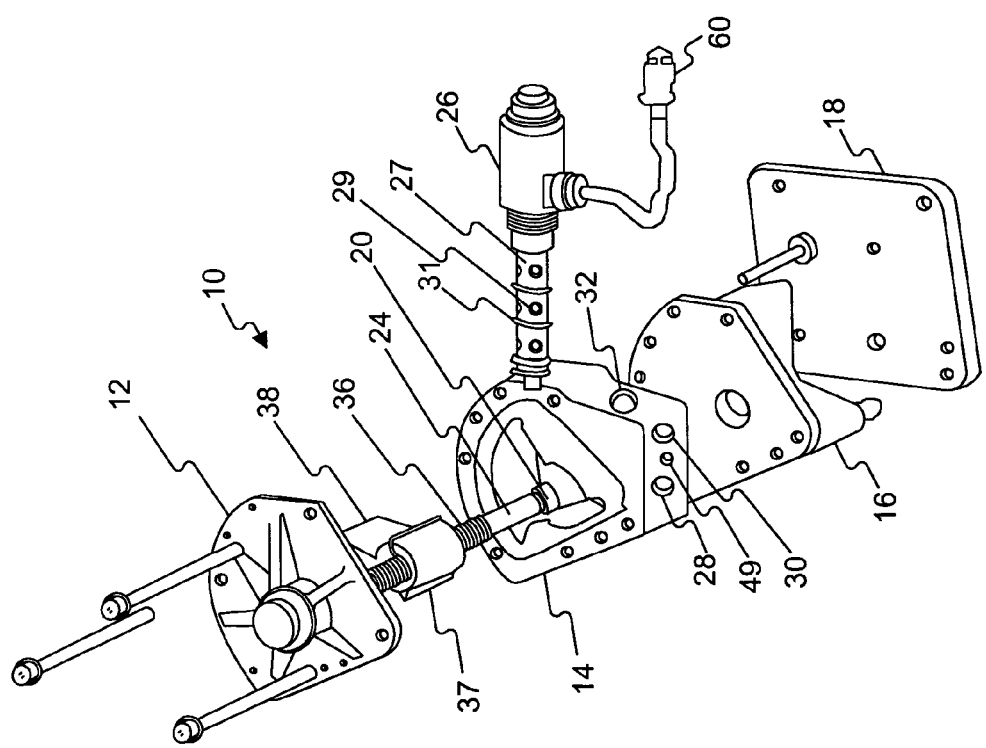
FIG. 2 is an exploded view of a valve actuation assembly according to another exemplary embodiment of the present disclosure.

As shown in FIG. 2, a bias spring 36 may be disposed around shaft 24. In addition, a vane 38 may be rigidly connected to the shaft 24, and the bias spring 36 may be in communication with vane 38. Although a single bias spring 36 is illustrated in FIG. 2, it is understood that the actuation assembly may include additional bias springs 36 in communication with the vane 38 and/or the shaft 24. The bias spring 36 may be configured to apply a spring force to the vane 38 and/or the shaft 24. This spring force may bias the vane 38 and/or the shaft 24 to assume the position shown in FIG. 3. In an exemplary embodiment, the bias spring 36 may be connected to the vane 38 and may pass through a portion of the vane 38. Alternatively, the bias spring 36 may extend along and/or act on a shelf 37 of the vane 38.

It is understood that the actuation assembly 10 may also include one or more bushings 20 configured to assist in securing the shaft 24 and reducing the wear on components of the actuation assembly 10 over time due to rotation and/or other movement. The actuation assembly 10 may also include a number of bolts, dowels, and/or other structures known in the art to assist in, for example, connecting the top cover 12, the housing 14, the bottom cover 16, and/or the adapter plate 18.

Although shown in FIG. 2 as including a threaded section, it is understood that the control valve 26 may include any conventional means or structure to facilitate the connection between the control valve 26 and the housing 14. The control valve 26 may be inserted through a valve orifice 32 of the housing 14 and, in an exemplary embodiment, the valve orifice 32 may include threads and/or other connection structures corresponding to those located on the control valve 26. The control valve 26 may also include a casing 27. The casing 27 may define a number of flow orifices 29 configured to permit working fluid to flow into and/or out of the casing 27. It is understood that the control valve 26 may also include any number of sealing structures 31, such as, for example, O-rings or other structures known in the art. In an exemplary embodiment of the present disclosure, the sealing structures 31 may be disposed about a surface of the casing 27. The sealing structures 31 may assist in fluidly sealing portions of the control valve 26 when, for example, the casing 27 is disposed within and fluidly connected to the housing 14. Although shown in FIG. 2 as being substantially cylindrical, it is understood that the casing 27 and/or other portions of the control valve 26 disposed within the housing 14 may be any shape known in the art. In an exemplary embodiment, the casing 27 may be substantially hollow.

Figure 3:
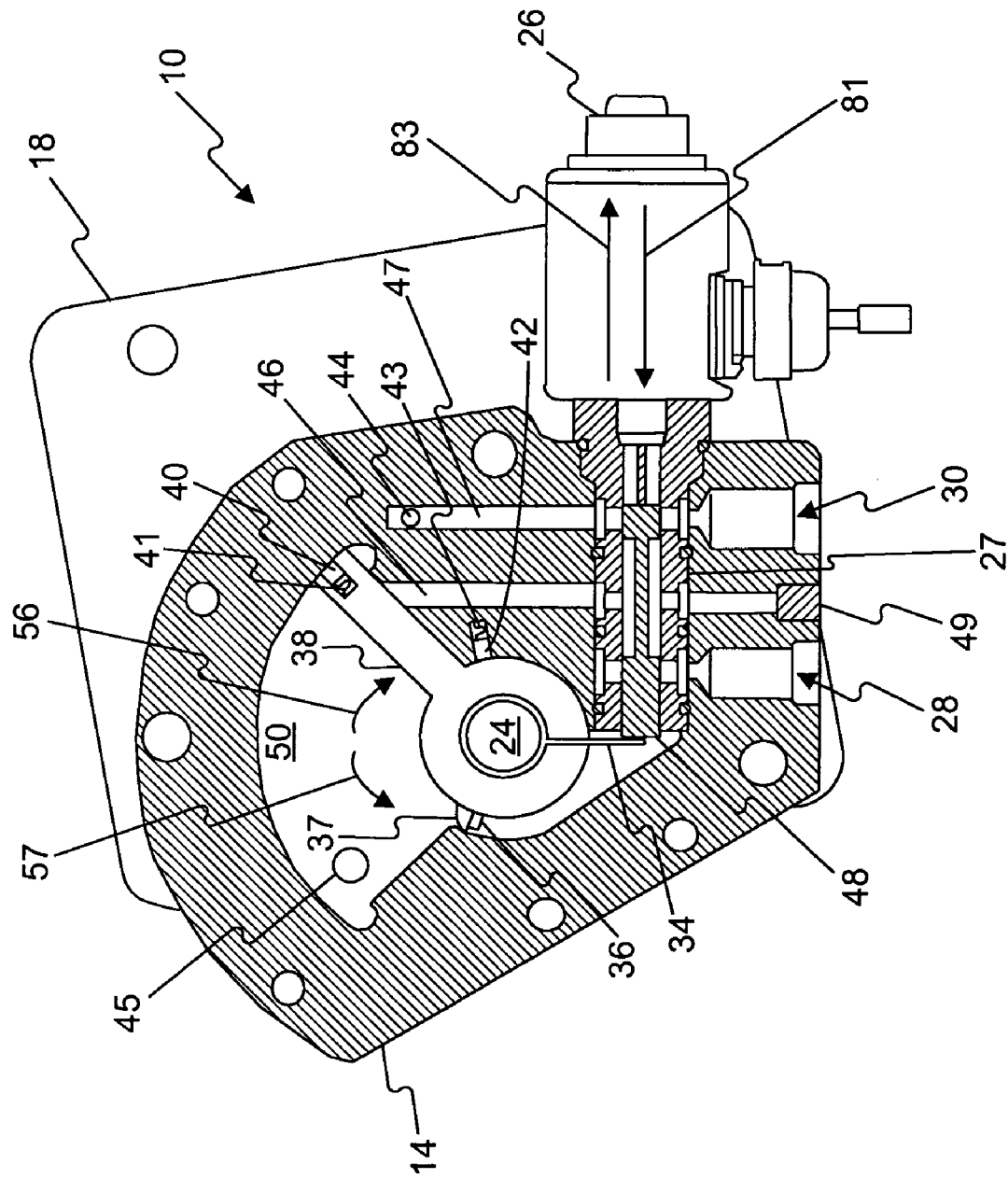
FIG. 3 is a cross-sectional view of a valve actuation assembly according to still another exemplary embodiment of the present disclosure.

As shown in FIG. 3, the control valve 26 may further include a spool 48 disposed within the casing 27. The spool 48 may be connected to the cylinder of the solenoid described above and may be slidably movable within the hollow casing 27. It is understood that movement of the spool 48 within the casing 27 may permit and/or substantially restrict a flow of working fluid to pass through one or more of the flow orifices 29 (FIG. 2) of the control valve 26.

As illustrated in FIG. 3, the housing 14 may define a first passage 46 and a second passage 47. The passages 46, 47 may be formed in the housing 14 by any machining process known in the art, such as, for example, drilling or milling. In an exemplary embodiment, the supply port 28 may be fluidly connected to the first passage 46. In another exemplary embodiment, the casing 27 of the control valve 26 may facilitate a fluid connection between the supply port 28 and the first passage 46 when the control valve 26 is disposed within and fluidly connected to the housing 14. In such an embodiment, actuation of the spool 48 may assist in fluidly connecting the supply port 28 to the first passage 46. Actuation of the spool 48 may also assist in fluidly connecting the drain port 30 to the second passage 47 of the housing 14.

As mentioned above, the housing 14 may also define a vane channel 50. The vane 38 may be disposed within the vane channel 50 and may be configured to rotate within the vane channel 50 as a force is applied thereto. Such rotation is illustrated by clockwise rotation arrow 56 and counterclockwise rotation arrow 57. As will be described in greater detail below, such a force may be applied to the vane 38 by, for example, supplying a pressurized flow of working fluid to the vane channel 50 through the first passage 46.

As illustrated in FIG. 3, the first passage 46 and the second passage 47 may be fluidly connected to the vane channel 50. As will be described in greater detail below, a fluid may flow from the second passage 47 through a second passage orifice 44.

It is understood that the fluid flows described above may also be reversed as the direction of vane rotation with the vane channel 50 changes. As discussed above, the housing 14 may define additional channels and/or passages (not shown) for passing fluid between the vane channel 50 and the first passage 46 or the second passage 47 as the vane 38 rotates. Thus, a fluid may pass into the vane channel 50 via a channel orifice 45. Although not shown in FIG. 3, it is understood that the housing 14 may also define fluid passages connecting the second passage orifice 44 to the channel orifice 45.

The vane 38 may be any shape, size, and/or configuration known in the art. The vane 38 may be made of any of the materials discussed above with respect to the housing 14. The vane 38 may be rigidly connected to the shaft 24 in any conventional manner such that rotation of the vane 38 causes a corresponding rotation of the shaft 24. For example, the vane 38 may be press-fit onto the shaft 24. Alternatively, the shaft 24 may be keyed to facilitate a rigid connection with the vane 38. The vane 38 may include one or more vane seals 40 configured to form a fluid seal between the vane 38 and the housing 14 as the vane 38 rotates within the vane channel 50. For example, as the vane 38 rotates in a counterclockwise direction, the vane seal 40 may substantially restrict a fluid disposed within the vane channel 50 from flowing around a perimeter of the vane channel 50 from the left side of the vane 38 to the right side of the vane 38. The vane 38 may also include one or more expansion devices 41, such as, for example, a V-spring. The expansion device 41 may apply a force to the vane seal 40 to assist in forming a seal between the vane 38 and the housing 14. The vane seal 40 may be made of any material known in the art capable of forming a seal between two moving parts while minimizing the friction formed therebetween. Such materials may include, for example, Teflon. As shown in FIG. 3, the housing 14 may also include a vane seal 42 and an expansion device 43. The vane seal 42 and expansion device 43 may be configured to substantially restrict a fluid from passing from the vane channel 50 to other parts of the housing 14 while the vane 38 rotates. The vane seal 42 may be mechanically similar to the vane seal 40 described above. Similarly, the expansion device 43 may be mechanically similar to the expansion device 41 described above.

As discussed above, the bias spring 36 may be configured such that at least a portion of the bias spring 36 may impart a spring force onto the shelf 37. The spring force may act upon the shelf 37 in the clockwise direction illustrated by clockwise rotation arrow 56 and may bias the vane 38 to substantially fluidly seal the first passage 46 when the vane 38 is in a resting position, as shown in FIG. 3. Thus, for the vane 38 to rotate in a counterclockwise direction, from the position shown in FIG. 3 to another position within the vane channel 50, the vane 38 may overcome the spring force applied by the bias spring 36.

The actuation assembly 10 may also include a feedback spring 34 connected to the shaft 24 and/or the vane 38. The feedback spring 34 may also be in communication with the spool 48. Thus, the feedback spring 34 may maintain contact with the spool 48 whether the vane 38 rotates in a clockwise or counterclockwise direction. As the vane 38 rotates in the counterclockwise direction, the spring force imparted by feedback spring 34 to the spool 48 may increase. Conversely, when the vane 38 rotates in the clockwise direction, the spring force imparted by the feedback spring 34 to the spool 48 may decrease. While the actuation assembly 10 has been described above as including a bias spring 36 and a feedback spring 34, it is understood that the actuation assembly 10 may also include any other conventional devices capable of providing a biasing force and/or a feedback force to the components of the actuation assembly 10 and/or the valve assembly 25.

Figure 4:
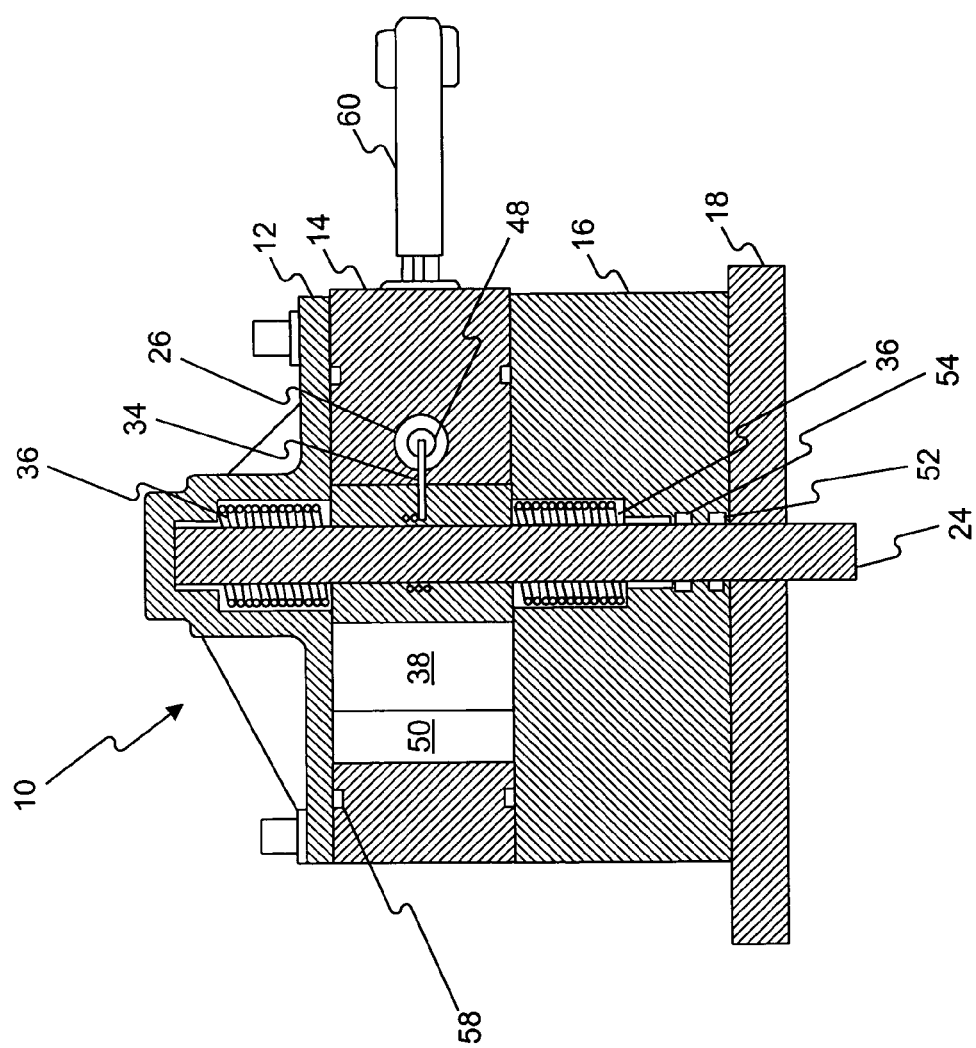
FIG. 4 is a cross-sectional view of a valve actuation assembly according to yet another exemplary embodiment of the present disclosure.

As shown in FIG. 4, a portion of the feedback spring 34 may pass through the vane 38 while maintaining contact with the spool 48 of the control valve 26. It is understood that the actuation assembly 10 may further include one or more housing seals 58 configured to substantially fluidly seal components of, for example, the housing 14. The housing seals 58 may also assist in forming a fluid seal between, for example, the housing 14, and the top cover 12 and/or the bottom cover 16. The actuation assembly 10 may also include a high pressure seal 54 and a low pressure seal 52 disposed around the shaft 24. Similar to the seals described above, the high pressure seal 54 and low pressure seal 52 may form a fluid seal around the shaft 24 and may substantially restrict fluid from exiting the bottom cover 16 as the shaft 24 rotates. The seals 58, 54, 52 may be made of any sealing material known in the art, such as, for example, Teflon or rubber. In an exemplary embodiment, the housing seal 58 may be a gasket, and the high pressure seal 54 and low pressure seal 52 may be O-rings.

INDUSTRIAL APPLICABILITY

The actuation assembly 10 of the present disclosure may be used to actuate any type of flow control valve known in the art.

Such flow control valves may include, for example, mixing valves configured to controllably combine multiple fluid flows into a single fluid flow at a desired ratio. Such mixing valves may be fluidly connected to an inlet of, for example, a spark ignition engine, a diesel engine, or any other power source known in the art. The power source may be used in any conventional application where a supply of power is required. For example, the power source may be used to supply power to stationary equipment, such as power generators, or other mobile equipment, such as vehicles. Such vehicles may include, for example, automobiles, work machines (including those for on-road, as well as off-road use), and other heavy equipment.

The actuation assembly 10 may be configured to impart a large amount of torque to the mixing valve 62 through a mechanical connection between the shaft 24 and components of the mixing valve 62. The actuation assembly 10 may be significantly smaller and more compact than existing systems using, for example, motors, vacuum sources, pneumatic systems, or hydraulic cylinders to rotate the shaft 24. In addition, components of the actuation assembly 10 may provide internal position feedback to the valve assembly 25 used to control the position of the vane 38 and the shaft 24. This internal position feedback may be in the form of the spring force applied to the spool 48 by the feedback spring 34. The use of internal position feedback to control the position of the shaft 24 may assist in more accurately controlling the ratio of, for example, recirculated exhaust gas to ambient air directed to a power source 64 by the mixing valve 62. The operation of the actuation assembly 10 will now be described in detail with respect to FIG. 1 unless otherwise noted. It is understood that the dashed lines originating from and terminating at the electronic control module ("ECM") 78 in FIG. 1 represent electrical or other control lines. The solid lines connecting each of the components of FIG. 1 represent fluid flow lines.

As illustrated by flow arrow 68, the power source 64 may produce a flow of exhaust gas. After exiting the power source 64, the exhaust gas may pass through an aftertreatment system 74 of the power source 64. Components (not shown) of the aftertreatment system 74 may remove a portion of the pollutants contained within the exhaust gas before the exhaust gas is released into the environment. A portion of the filtered exhaust gas may also be recirculated to an intake 66 of the power source 64. As illustrated by flow arrow 70 of FIG. 1, recirculated exhaust gas may pass through, for example, an EGR line (not shown) of the aftertreatment system 74. The EGR line may direct the portion of the filtered exhaust gas to the mixing valve 62. As illustrated by flow arrow 72, the mixing valve 62 may combine the exhaust gas with a flow of ambient air to produce a single intake flow. The single intake flow may be directed to the intake 66 of the power source 64, as illustrated by the flow arrow 88. The actuation assembly 10 may be mechanically connected to the mixing valve 62 and may be configured to control the ratio of ambient air to recirculated exhaust gas directed to the power source 64 by the mixing valve 62.

During operation of the power source 64, the ECM 78 may receive one or more signals containing power source operating characteristic information and/or recirculated exhaust gas flow characteristic information. As shown in FIG. 1, the power source 64 may include one or more sensors 86 configured to detect power source operating characteristics. The sensed operating characteristics may include, for example, throttle position, oil pressure, power source temperature, and/or power speed. It is understood that the aftertreatment system 74 may also include one or more sensors 76 configured to sense one or more characteristics of the recirculated exhaust gas flow. Such flow characteristics may include, for example, mass air flow, flow temperature, and/or particulate content of the exhaust gas. In an exemplary embodiment of the present disclosure, the sensor 76 may be disposed within the EGR line of the aftertreatment system 74.

As illustrated by signal arrow 82 and signal arrow 84, the ECM 78 may receive signals sent from the sensors 76, 86, respectively, and may enter the information contained in the signals into one or more preset algorithms. Using these algorithms, the ECM 78 may calculate, for example, the current position of the mixing valve 62. The ECM 78 may also calculate a desired mixing valve position based on the sensed characteristics. In addition, the ECM 78 may determine whether or not to change the current position of the mixing valve 62 to the desired mixing valve position, thereby changing the ratio of recirculated exhaust gas to ambient air flow entering the intake 66 of the power source 64, based on these calculations. The ECM 78 may use, for example, a number of preset mass air flow maps stored in its memory to assist in making this determination. If the ECM 78 determines that a change in the above ratio is required, the ECM 78 may generate an input signal and may send the input signal to the control valve 26. The input signal, represented by command arrow 80 of FIG. 1, may correspond to the calculated desired mixing valve position discussed above. The input signal sent by the ECM 78 cause an electrical current to be directed to the solenoid within the control valve 26, thereby energizing the solenoid. Energizing the solenoid may cause the cylinder within the control valve 26 to change its position.

Actuation of the cylinder may cause the cylinder to apply a force to the spool 48 and may cause the spool 48 to move from a neutral position (illustrated in FIG. 3) to a biased position. In the biased position, the force applied to the spool 48 by the cylinder is greater than the spring force applied by the feedback spring 34. In an exemplary embodiment, when the solenoid is energized, the cylinder and the spool 48 may move in the direction of actuation arrow 81 (FIG. 3). In such an embodiment, the force applied to the spool 48 by the cylinder and the angular position of the shaft 24 may be substantially directly proportional to amount of current directed to the control valve 26. It is understood the force applied to the spool 48 by the cylinder may be balanced by the spring force applied to the spool 48 by the feedback spring 34. It is also understood that this spring force may be related to the angular position of the shaft 24 and/or the vane 38.

When the spool 48 is in the neutral position, a pressurized working fluid, such as, for example, oil may be prohibited from passing through at least the first and second passages 46, 47. When the spool 48 is in the biased position, however, oil may be permitted to pass into and out of the vane channel 50. Oil may also be permitted to pass through the hollow casing 27 and through at least the first and second passages 46, 47 of the housing 14. The oil entering the vane channel 50 may apply an oil force to the vane 38 to effect a change in the angular position of the vane 38. The vane 38 may rotate in, for example, the direction of counterclockwise rotation arrow 57 until the vane 38 and the shaft 24 reach an equilibrium position in which the force applied to the spool 48 by the feedback spring 34 equals the force applied to the spool 48 by the cylinder. In this equilibrium position, the spool 48 may be forced back to the neutral position illustrated in FIG. 3 and oil may again be prohibited from passing through at least the first and second passages 46, 47. The equilibrium position may correspond to the desired mixing valve position discussed above. The desired mixing valve position may result in a desired ratio of ambient air and recirculated exhaust gas flow entering the intake 66 of the power source 64.

It is understood that as the vane 38 moves in a counterclockwise direction, the spring force applied to the spool 48 by the feedback spring 34 may increase. As this feedback force increases, it may overcome the force applied to the spool 48 by the cylinder of the energized solenoid. As a result, the spool 48 may move in the direction of arrow 83. Movement of the spool 48 in this direction may result in pressurized oil flowing through the casing 27 and through the first and second passages 46, 47 such that the continued movement of the vane 38 may be counteracted. Oil may continue to flow through the actuation assembly 10 in this manner until the force applied to the spool 48 by the feedback spring 34 equals the force applied to the spool 48 by the cylinder and the spool 48 returns to the neutral position. The vane 38 and the shaft 24 may remain at the equilibrium position once the spool 48 returns to its neutral position and at least the first and second passages 46, 47 are substantially fluidly sealed.

It is also understood that to move the vane 38 in the direction of the clockwise rotation arrow 56 to a new equilibrium position, pressurized oil may be supplied to the vane channel 50 through, for example, the channel orifice 45. Rotation of the vane 38 in the clockwise direction may be induced by reducing the current supplied to the solenoid of the control valve 26. Such a reduction in current may cause the spool 48 to move in the direction of arrow 83. Such movement of the spool 48 may cause oil to exit the vane channel 50 through, for example, the first passage 46. In this scenario, the spring force exerted by the feedback spring 34 may decrease until a new vane equilibrium position is reached.

It is further understood that the actuation assembly 10 described above may be operable in an open-loop and/or a closed-loop control environment. In an exemplary closed-loop control strategy, the ECM may continually receive signals from the sensors 86, 76 during operation of the work machine. In such an exemplary embodiment, the ECM may repeatedly determine the desired mixing valve position based on the sensed operating and flow characteristics. In addition, the ECM may repeatedly generate command signals and send the signals to the control valve 26. Thus, the position of the vane 38 may be changed multiple times based on repeated calculations and/or determinations made by the ECM as a work machine application is performed. Alternatively, in an exemplary open-loop control strategy, the van position may be changed based on a single calculation and/or determination by the ECM. In such an exemplary embodiment, the open-loop control strategy may be initiated manually.

It will be apparent to those having ordinary skill in the art that various modifications and variations can be made to the disclosed actuation assembly 10 without departing from the scope of the invention. For example, in an embodiment, the actuation assembly 10 may include a filtration device, such as a screen or mesh, connected to the supply port 28 and/or the drain port 30 and configured to substantially prohibit foreign objects suspended in the pressurized oil from entering the actuation assembly 10. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. An actuation assembly, comprising:
    a housing;
    a vane connected to a shaft, wherein the vane is at least partially disposed within the housing;
    a valve assembly connected to the housing;

a feedback device connected to at least one of the vane and the shaft, the feedback device being configured to apply a feedback force to the valve assembly; and a bias device configured to apply a bias force directly to the vane.

2. The actuation assembly of claim 1, wherein the housing defines a plurality of flow channels fluidly connected to a chamber of the housing and the vane is at least partially disposed within the chamber.

3. The actuation assembly of claim 2, wherein the vane is configured to rotate within the chamber and the shaft is configured to rotate with the vane.

4. The actuation assembly of claim 3, wherein the feedback force applied to the valve assembly changes as the vane rotates.

5. The actuation assembly of claim 2, wherein the valve assembly is configured to assist in controlling a fluid flow through at least one of the plurality of flow channels.

6. The actuation assembly of claim 5, wherein the fluid flow assists in rotating the vane within the chamber.

7. The actuation assembly of claim 2, wherein the valve assembly includes a spool configured to assist in substantially sealing at least one of the plurality of flow channels.

8. The actuation assembly of claim 1, further including a controller configured to transmit an input signal to the valve assembly for controlling a position of the valve assembly.

9. The actuation assembly of claim 8, further including at least one sensor connected to the controller, the controller being configured to receive at least one signal from the at least one sensor and determine the input signal based on the at least one signal from the at least one sensor.

10. The actuation assembly of claim 1, wherein the bias device includes a spring that is configured to bias the vane to seal at least one of the plurality of flow channels.

11. An actuation assembly, comprising:
a housing;
a vane connected to a shaft, wherein the vane is at least partially disposed within the housing;
a valve assembly connected to the housing;
a feedback device connected to at least one of the vane and the shaft, the feedback device being configured to apply a feedback force to the valve assembly, the feedback device including a spring configured to assist in applying the feedback force; and
a bias device configured to apply a bias force to the vane.

12. The actuation assembly of claim 11, wherein:
a first end of the spring of the feedback device contacts a spool of the valve assembly; and a second end of the spring of the feedback device contacts at least one of the vane and the shaft.

13. An actuation assembly, comprising:
a housing defining a chamber fluidly connected to at least one flow channel;
a vane disposed within the chamber and connected to a shaft of the valve actuation assembly, the vane is configured to rotate within the chamber and the shaft is configured to rotate with the vane;
a valve assembly connected to the housing, the valve assembly being configured to assist in controlling a fluid flow through the at least one flow channel; and
a feedback device in communication with the valve assembly and connected to at least one of the vane and the shaft, the feedback device being configured to assist in controlling the position of the vane within the chamber.

14. The actuation assembly of claim 13, wherein the feedback device includes a spring.

15. The actuation assembly of claim 13, further including a bias device configured to apply a bias force to the vane.

16. The assembly of claim 13, wherein the housing defines a plurality of the flow channels fluidly connected to the chamber.

17. The actuation assembly of claim 16, wherein the valve assembly is configured to assist in controlling a fluid flow through the plurality of the flow channels.

18. The actuation assembly of claim 17, wherein the fluid flow assists in rotating the vane within the chamber.

19. The actuation assembly of claim 13, wherein the feedback device is configured to apply a feedback force to a spool of the valve assembly.

20. The actuation assembly of claim 19, wherein the feedback force changes as the vane rotates.

21. The actuation assembly of claim 19, wherein the spool is configured to substantially seal at least one of a plurality of flow channels defined by the housing.

22. The actuation assembly of claim 13, wherein:
the valve assembly is capable of moving between a neutral position and a biased position;
when the valve assembly is in the biased position, the fluid flow is allowed to pass through the at least one flow channel; and
when the valve assembly is in the neutral position, the fluid flow is substantially restricted from passing through the at least one flow channel.

* * * * *